(12) United States Patent
Ota

(10) Patent No.: US 9,108,343 B2
(45) Date of Patent: Aug. 18, 2015

(54) TEMPLATE TREATMENT METHOD

(75) Inventor: Takumi Ota, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 421 days.

(21) Appl. No.: 13/607,305

(22) Filed: Sep. 7, 2012

(65) Prior Publication Data

US 2013/0127084 A1    May 23, 2013

(30) Foreign Application Priority Data

Nov. 18, 2011  (JP) ................................ P2011-252655

(51) Int. Cl.
*B29B 7/04* (2006.01)
*B29C 43/02* (2006.01)

(52) U.S. Cl.
CPC .................................... *B29C 43/021* (2013.01)

(58) Field of Classification Search
CPC ................................................... G03F 1/0092
USPC .......................................................... 264/39
See application file for complete search history.

(56) References Cited

U.S. PATENT DOCUMENTS

| | | | |
|---|---|---|---|
| 5,969,428 A | 10/1999 | Nomura et al. | |
| 7,510,388 B2 | 3/2009 | Terasaki et al. | |
| 7,690,910 B2 | 4/2010 | Nakamura et al. | |
| 7,981,304 B2 | 7/2011 | Terasaki et al. | |
| 2005/0064344 A1 | 3/2005 | Bailey et al. | |
| 2010/0044921 A1* | 2/2010 | Ito ................................. | 264/402 |
| 2011/0018168 A1* | 1/2011 | Wuister et al. ................ | 264/293 |

FOREIGN PATENT DOCUMENTS

| JP | 2006-005023 | 1/2006 |
|---|---|---|
| JP | 2010-034584 | 2/2010 |
| JP | 2011-029642 | 2/2011 |

* cited by examiner

*Primary Examiner* — Galen Hauth
(74) *Attorney, Agent, or Firm* — Patterson & Sheridan, LLP

(57) ABSTRACT

According to one embodiment, the template treatment method includes a substrate having a principal surface, a first pattern formed on the principal surface and including a plurality of recesses, and a second pattern formed on the principal surface at a position different from the first pattern and including a plurality of recesses. The first pattern contains a first material and the second pattern contains a second material different from the first material. The second pattern is coated with a coating containing a third material different from the first and second materials. The template is cleaned while the second pattern is coated. After the coating is removed, the second pattern is exposed.

18 Claims, 6 Drawing Sheets

TEMPLATE TREATMENT METHOD

CROSS-REFERENCE TO RELATED APPLICATION

This application is based upon and claims the benefit of priority from Japanese Patent Application No. 2011-252655, filed Nov. 18, 2011; the entire contents of which are incorporated herein by reference.

FIELD

The embodiments described herein relate to the imprinting of thin film layers with a template.

BACKGROUND

Recent advances in resist patterning methods have been introduced using physical, three dimensional, patterning members to imprint a pattern in a thin film useful as a mask for the etching of an underlying layer over which the patterned mask layer is formed. Pursuant to this pattern forming method, a plate known as template is used. On the surface of the template (patterned surface), an embossed three dimensional pattern, corresponding to a negative of the three dimensional pattern to be formed on the substrate or film layer (resist), and an alignment mark for aligning the template to a substrate or film layer on which the three dimensional pattern is to be transferred, are formed. The negative three dimensional pattern on the template, when applied to a thin film, results in an opposite, positive three dimensional pattern having protrusions and recesses opposite or negative in nature to the protrusions and recesses on the template, being formed on the thin film. This patterned thin film may be used as a masking layer for etching an underlying film, wherein the mask and the portions of the layer underlying the mask which underlie the recesses is exposed to an etchant, and in the recess areas of the resulting masking layer the underlying film layer or substrate is exposed to the etchant, and thus etched, but where the protrusions in the mask layer protect the underlying material from exposure to the etchant, etching of the underlying material is substantially prevented. As a result, a pattern corresponding to the pattern in the mask layer is etched into, and thus transferred to, the underlying material.

The above described template is useful for forming patterns in photocurable resins, including photoresist, resist layers including layers used as masking layers in the fabrication of semiconductor and other devices. Where the resist material used for the fabrication of a mask is a photoresist, that is, a resist which is activated by exposure to light, this optical imprint method is often carried out in the following steps or sequence of operations:

1. an operation in which a photocuring resin is coated on the surface of the substrate for processing;
2. an operation in which the surface of the substrate for processing and the pattern surface of the template are aligned with one other;
3. an operation in which the pattern surface of the template is brought into, and maintained in contact with, the photocuring resin for a prescribed time, such that the photocuring resin fills the recessed portions of the pattern surface due to the capillary phenomenon;
4. an operation in which the photocuring resin is cured by irradiation by light; and
5. an operation (mold releasing) in which the template is removed from the cured photocuring resin (resin pattern), such that the remaining resin pattern is useful as a mask to etch a pattern corresponding to the mask in the underlying material of or on the substrate.

Repeated use of the mask to form a pattern for an etch mask has been hampered by the occurrence, after releasing of the template from the photoresist material, of the photocuring resin sticking on the emboss pattern of the template. Consequently, it is necessary to clean the template of this adhered photoresist material intermediate of the processing of one or more substrates therewith. The methods of cleaning the template commonly include a dry process using plasma and/or a wet process using a chemical solution.

When the template is cleaned, in addition to the emboss pattern, the alignment mark is also exposed to the plasma or chemical solution. As a consequence, the alignment mark is degraded during the cleaning of the template.

DETAILED DESCRIPTION

In general, according to one embodiment, the invention will be explained with reference to the FIGS.

According to the embodiment, there is provided a template treatment method that can suppress degradation of the pattern, and in particular, suppress degradation of the alignment mark region, as a result of cleaning of the template.

According to the template treatment method of the embodiment, treatment is carried out for a template having a substrate that has a principal surface, a first pattern formed on the principal surface and including a plurality of recesses or recesses, and a second pattern formed on the principal surface at a position different from the first pattern and including a plurality of recesses, with the first pattern containing a first material and with the second pattern containing a second material different from the first material. According to the template treatment method in the embodiment, the second pattern is coated with a coating containing a third material different from the first and second materials. Then, while the second pattern remains coated by the coating, the template is cleaned. The coating is then removed, and the second pattern is exposed.

Embodiment 1

Figure 1:
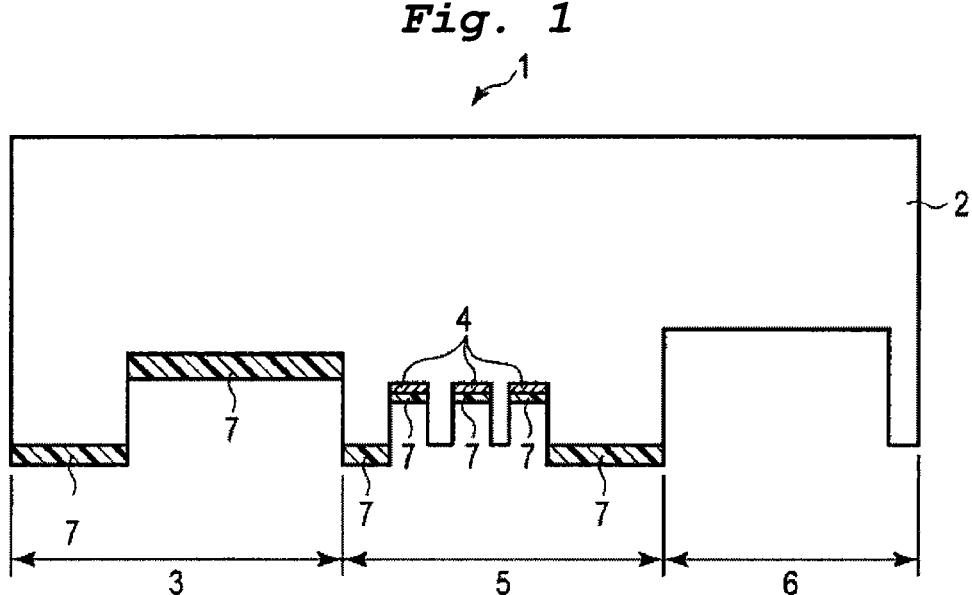
FIG. 1 is a schematic diagram illustrating an example of a template, showing schematically three regions, in section, of a template for embossing a pattern into a layer, on which the template treatment method related to Embodiment 1 is applied.

FIG. 1 is a schematic diagram, in section, illustrating an example of a template 1 when the template treatment method related to Embodiment 1 is adopted. In this embodiment, the template 1 is explained as the part that is used in the optical imprint method.

Here, the template 1 includes an optically transparent substrate 2, at least optically transparent to the light used later to cure the imprinted material, and a main pattern 3 (first pattern) including a plurality of recesses and a plurality of projections arranged on the principal surface of the transparent substrate 2 (the surface on the side opposite to the surface irradiated by light). Although the main pattern 3 is shown schematically in the Fig. as having only a single recess and a single projection, it should be understood that the actual pattern in the main pattern area 3 includes multiple recesses interspersed among multiple, corresponding, projections.

The base material of the transparent substrate 2 is, e.g., fused silica. The main pattern 3 is formed by selectively etching the transparent substrate 2, so that the material of the main pattern 3 (the first material) is the same as the base material of the transparent substrate 2. The main pattern 3 includes the pattern corresponding to a pattern, such as a device pattern, a metal layer wiring pattern, etc., that will be formed on the wafer. In order to simplify the explanation, in FIG. 1, the main pattern 3 is schematically illustrated.

On the principal surface of the template 1, in addition, a material (the second material) 4 different from the material of the main pattern 3 is contained; at the same time, an alignment mark (the second pattern) 5 is formed at a position different from the main pattern 3. As shown in the Fig. this different material 4 may be present in only a portion of the alignment mark 5, and the main portion of the protrusions and recesses formed in the second region may, as with the main pattern 3, be formed by pattern etching the substrate 2 and then depositing the second material 4 into the recesses of the second pattern forming the alignment mark to the result or structure shown in FIG. 1 at 4.

The alignment mark 5 also includes plurality of recesses and plurality of projections. The plurality of recesses of the alignment mark 5 are shallower than the plurality of recesses of the main pattern 3. The bottom surface of the plurality of recesses of the alignment mark 5 is coated with the second material 4. For example, the second material 4 may be chromium.

Because the upper surface of the plurality of projections (fused silica) and the bottom surface of the plurality of recesses (chromium) of the alignment mark 5 have different optical reflectivity values, there is a prescribed intensity distribution (contrast) for the light reflected from the alignment mark 5. Consequently, by irradiating light on the template and detecting the reflected light, it is possible to locate the position of the alignment mark 5. Also, instead of the bottom surface of the plurality of recesses of the alignment mark 5, the upper surface of the plurality of projections of the alignment mark 5 may be coated by the second material 4.

In order to facilitate understanding, in FIG. 1, the alignment mark 5 is shown as the right hand side of the main pattern 3. However, one may also adopt a scheme in which the position of the alignment mark 5 is not adjacent to the right hand side of the main pattern.

In addition, the template 1 has a dummy pattern 6. The plurality of recesses of the dummy pattern 6 is deeper than the plurality of recesses of the main pattern 3. As shown in FIG. 1, for example, the dummy pattern 6 is arranged adjacent to the alignment mark 5. This dummy pattern may likewise include a plurality of projections and corresponding recesses, formed by selective etching of the recesses into the transparent substrate 2. If, during imprinting, excess material flows outwardly of the template 1, dummy pattern 6 provided a reservoir to catch the material so that it does not escape the template area during imprinting of the material.

Contaminants 7, such as for example the photocuring resin used in the imprint process, may become adhered to, or stick, to the principal surfaces of the template 1 when the template is removed from the substrate.

FIG. 2 through FIG. 8 are cross-sectional, schematic views of the template of FIG. 1 illustrating the template treatment method in this embodiment. As in FIG. 1, the template 2 and the projection and recess features thereof are shown schematically, it being understood that the main pattern 3 and the dummy pattern may include multiple recess and corresponding projections therein. Likewise the second material 4, and contaminant 7, are not shown in FIGS. 2 to 8.

Figure 2:
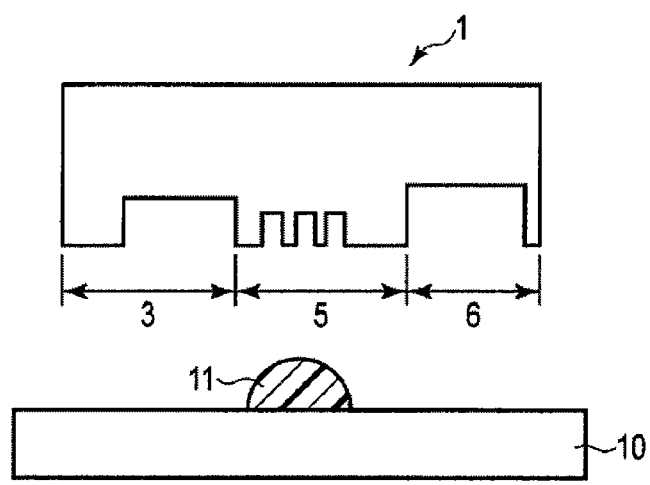
FIG. 2 is a cross-sectional view illustrating the template treatment method in Embodiment 1, wherein a protective material is located on a dummy substrate for placement on the template.

Referring now to FIG. 2, to enable cleaning of the template 2 of FIG. 1, without undue degradation of the alignment mark 5, a protective material is disposed over the alignment mark region, but not over the remaining pattern features on the substrate. To accomplish this, a liquid photocuring resin 11 (third material) is applied dropwise using a coating device, e.g., an inkjet system onto a dummy substrate 10 (e.g., wafer).

In the conventional imprint process, in order to improve the close contact property between the substrate for processing and the resin pattern, a close contact layer is formed on the substrate for processing in some cases, however, a close contact layer is not formed on the surface of the dummy substrate 10. According to the conventional imprint process, the purpose for using the close contact layer is to prevent the photocuring resin (resin pattern) cured under light irradiation from peeling (mold releasing defects) from the substrate for processing in the operation (mold releasing operation) in which the template is released from the substrate for processing.

Once the photocuring resin is positioned on the substrate as shown in FIG. 2, the template 1 is positioned above the dummy substrate 10, and the dummy substrate 10 and the template 1 are aligned with each other so that the photocuring resin 11 and the alignment mark 5 face each other.

Figure 3:
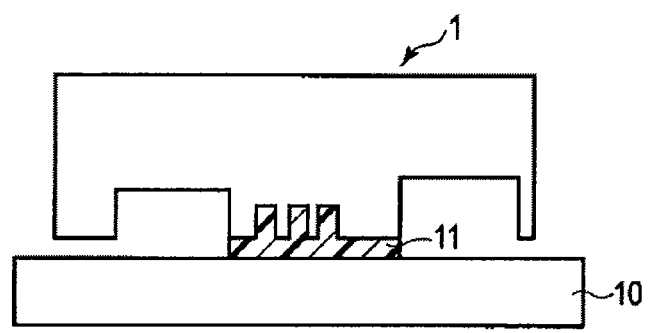
FIG. 3 is a cross-sectional view illustrating the template treatment method in Embodiment 1, wherein the material shown in FIG. 1 has been distributed on the alignment mark region of the template.

Referring now to FIG. 3, using an imprint device used to form an imprint pattern on a full substrate, the template 1 and the substrate 10, having the photoresist to be used to mask the alignment mark 5 positioned thereon, are brought into close proximity to cause the alignment mark 5 of the template 1 to be in contact with the liquid photocuring resin 11. The photocuring resin, which may be in liquid form, fills the recesses of the alignment mark 5, and is held in the plurality of recesses of the alignment mark 5 for a prescribed time so that liquid photocuring resin 11 flows or migrates into the plurality of recesses of the alignment mark. Although not bound by theory, it is believed that this is due to capillary action.

In this case, the alignment mark of the template 1 is brought into contact with the photocuring resin 11 so that the body of the template 1 does not contact with (hit) the dummy substrate 10. This measure is taken because if the template contacts with (hits) the dummy substrate 10, the main pattern could be damaged or contaminated.

In order to avoid contact (hit) between the main pattern and dummy substrate 10, for example, as shown in FIG. 3, the quantity of photocuring resin 11 in the region where the alignment mark is located is greater than that in the conventional imprint process; the interior of the plurality of recesses of the alignment mark can be filled by the photocuring resin 11 even when the alignment mark is not in contact with the dummy substrate 10. By controlling the quantity of the photocuring resin 11 (third material) fed onto the dummy substrate 10, it is possible to ensure that the main pattern (first pattern) does not contact the photocuring resin 11 because the resist in the alignment mark 5 region forms a cushion or spacer between the template 1 and the dummy substrate 10. However, instead of this scheme, one may also adopt a scheme in which the distance between the template 1 and the dummy substrate 10 is controlled, so that the main pattern 3 does not contact the photocuring resin 11. In addition, one may also adopt a scheme in which both the quantity of the photocuring resin 11 and the distance between the template 1 and the dummy substrate 10 are controlled, so that the main pattern 3 does not contact the photocuring resin 11.

Figure 4:
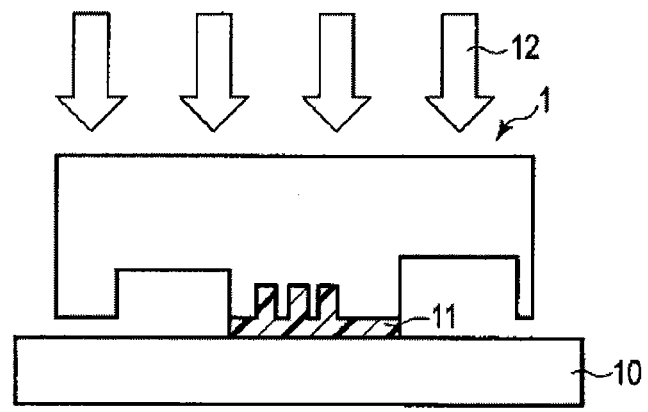
FIG. 4 is a cross-sectional view illustrating the template treatment method in Embodiment 1, wherein a curing agent, such as light, is directed to the protective material.

Referring now to FIG. 4, once the photocuring resin 11 is received in and over the alignment mark 5, while the template 1 is still maintained in close proximity to the dummy substrate 10, light 12 is irradiated from the back surface (the surface on the side opposite to the principal surface) of the template 1 to cure the photocuring resin 11.

Figure 5:
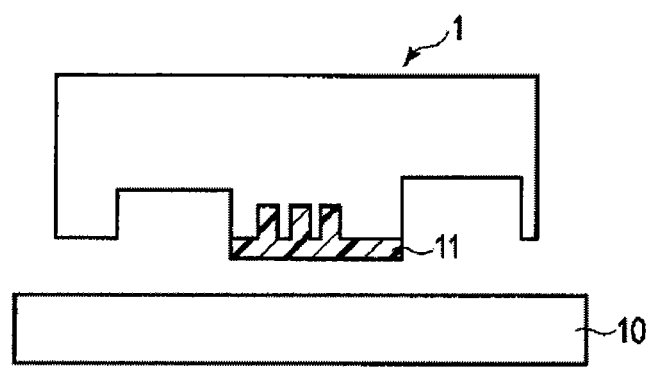
FIG. 5 is a cross-sectional view illustrating the template treatment method in Embodiment 1 following removal of the template, with the protective material adhered in the alignment mark section of the template, from the dummy substrate.

Referring now to FIG. 5, once the photocuring resin is cured, the template 1 is removed from the dummy substrate, with the cured resin remaining in place in the alignment mark 5 region of the template 1. As a result, the template 1 is in a state in which the alignment mark is coated with, and thus protected by, the resin coating 11.

Here, as explained above, in this embodiment, no close contact layer is formed on the surface of the dummy substrate 10, so that the photocuring resin 11 can be easily removed from the dummy substrate 10. Consequently, the structure in which the alignment mark is coated by the photocuring resin 11 can be easily realized.

Figure 6:
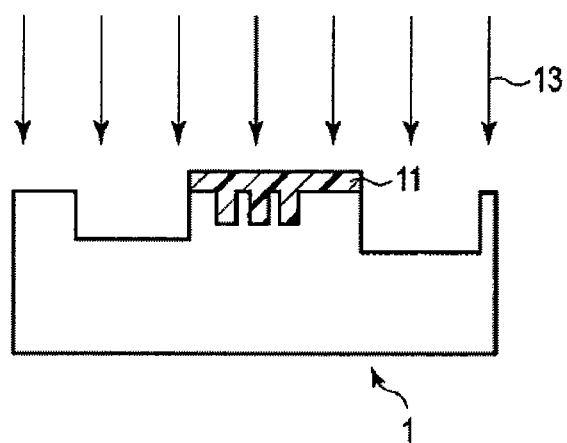
FIG. 6 is a cross-sectional view illustrating the template treatment method in Embodiment 1, wherein the template, having the alignment mark protected by the protective material, is cleaned.

Referring now to FIG. 6, in order to remove the contaminant 7 on the main pattern 3 (FIG. 1), forming gas 13 is used to clean the template 1. As the alignment mark 5 is coated by the photocuring resin 11, degradation (such as change in shape or degradation of the contrast material 4) of the alignment mark 5 by the forming gas 13 can be suppressed. By suppressing degradation in the alignment mark 5, variation in the alignment signal intensity is suppressed, so that it is possible to suppress degradation in the alignment precision and enhance or increase the useable life of the template 5. For example, the resin prevents oxygen from oxidizing the material 6 at the bottom of the recesses.

Figure 7:
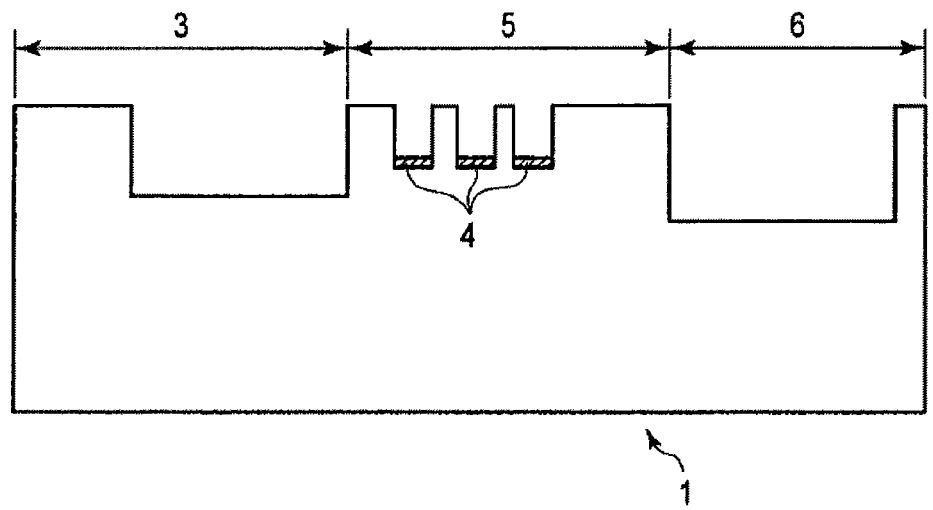
FIG. 7 is a cross-sectional view illustrating the template treatment method in Embodiment 1 succeeding FIG. 6.

Referring now to FIG. 7, the photocuring resin disposed on the alignment mark 5 is removed, such as with the forming gas 13 (e.g., $H_2$, $N_2$, $O_2$, or a combination thereof) or with a liquid etchant or dissolving agent, so that the alignment mark 5 is exposed (resin removal treatment).

Figure 8:
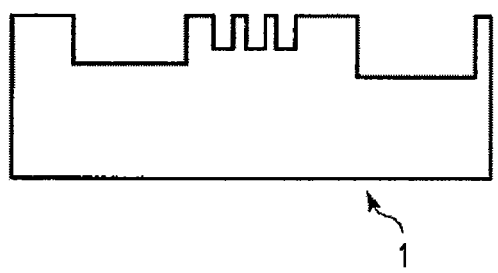
FIG. 8 is a cross-sectional view illustrating the template treatment method in Embodiment 1 succeeding FIG. 7.

Referring now to FIG. 8, to complete the cleaning of the a template 1, any residual contaminants on the template 1, such as those generated by the cleaning operation described with respect to FIG. 6 is removed by wet treatment. For example, the residual substance may be a carbide or carbon containing material generated when the photocuring resin as the contaminant is removed by oxygen gas. The wet treatment uses a chemical solution containing an acid. More specifically, for example, the wet treatment may be carried out using a chemical solution containing sulfuric acid.

The template 1 is then rinsed (rinse treatment) using pure water, ultra-pure water or other liquid (rinsing liquid), followed by heating to dry the template 1 by a hot plate.

Figure 9:
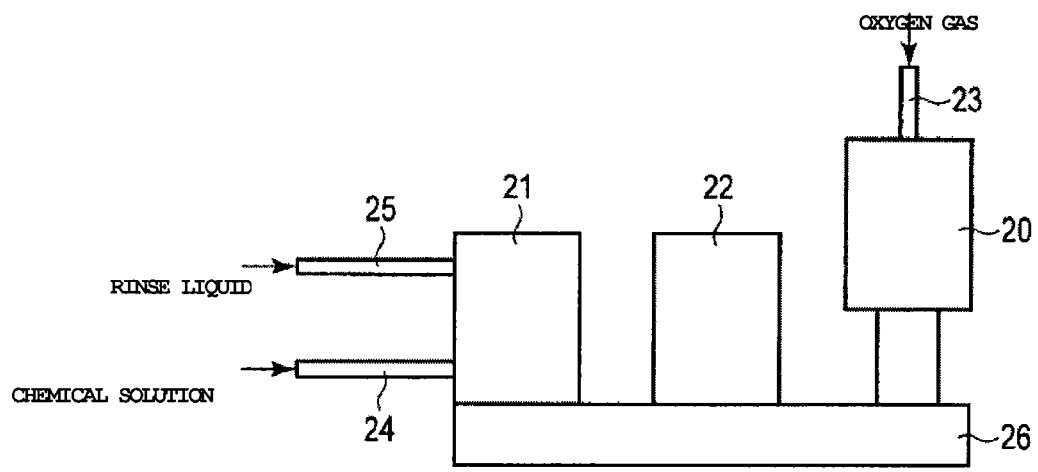
FIG. 9 is a schematic diagram illustrating the template cleaning device in the embodiment.

The operation shown in FIG. 6 and FIG. 7 (cleaning operation) is carried out by the template cleaning device in the embodiment shown schematically in FIG. 9. It should be understood that the physical layout of the cleaning device is shown schematically, and the actual physical layout enables movement of the template from the contaminant removal chamber, to the wet treatment chamber 21 without the need to pass though the drying chamber 22.

The template cleaning device in the embodiment includes contaminant removal chamber 20 for removing the contaminant using oxygen gas, treatment chamber 21 for performing the wet treatment using a chemical solution containing an acid and the rinse treatment of the template by a rinse liquid, a hot plate 22 for performing heating of the template, a supply line 23 for supplying oxygen gas into the contaminant removal chamber 20, a supply line 24 for supplying the chemical solution into the treatment chamber 21, a supply line 25 for supplying the rinse liquid into the treatment chamber 21, and a transporting system 26 for transporting the template from the contaminant removal chamber 20 to the treatment chamber 21 and transporting the template from the treatment chamber 21 to the hot plate 22 by a robot arm not shown in the drawings.

After end of the operation shown in FIG. 5, the template, having the photocuring resin selectively protecting the alignment mark 5, is taken out from the interior of the imprint device. The template is then transported into the contaminant removal chamber 20 of the template cleaning device of the embodiment. In the contaminant removal chamber 20, the cleaning operation of the template 1 is carried out by oxygen gas shown in FIG. 6. Then, the template is moved by the conveying device 26 to the treatment chamber 21, where the wet treatment by the chemical solution shown in FIG. 8 is carried out. The rinse treatment by the rinse liquid shown in FIG. 8 then is carried out in the treatment chamber 21. The template 1 is then moved by the conveying device 26 into the drying chamber 22 for drying.

According to the present embodiment explained above, by cleaning the template while the alignment mark is coated and protected by the coating, degradation of the alignment mark can be prevented, so that it is possible to suppress degradation in the alignment precision.

Embodiment 2

FIG. 10 through FIG. 14 are cross-sectional schematic views illustrating the template treatment method related to Embodiment 2. In the following drawings, the same reference numerals as those in the above are adopted to represent the corresponding parts, and a detailed explanation will not be repeated. Likewise, it should be understood that the main pattern and dummy pattern may include multiple protrusions and recess, while only on of each is shown in the Figs. for clarity.

Figure 10:
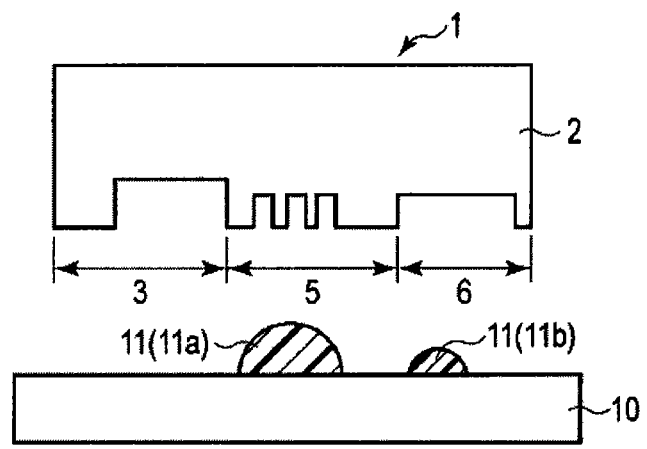
FIG. 10 is a cross-sectional view illustrating the template treatment method in Embodiment 2.

Referring first to FIG. 10, a well-known photocuring resin dispensing device, such as a ink jetting device (not shown) dispenses a liquid photocuring resin 11 (11a, 11b) on the dummy substrate 10. Then, using an imprint device used to form an imprint pattern on a full substrate, the dummy substrate 10 and template 1 are brought into alignment with each other.

In Embodiment 1, the photocuring resin 11 (11a) is applied dropwise onto the dummy substrate 10 in the region corresponding to the alignment mark 5. In this embodiment, in addition, the photocuring resin 11 (11b) is applied dropwise on the dummy substrate 10 in the region corresponding to the dummy pattern 7. The quantity of the photocuring resin 11b applied dropwise is a quantity with which the interior of the plurality of recesses of the dummy pattern 7 is not filled. Just as in Embodiment 1, for example, the quantity applied dropwise of the photocuring resin 11a is appropriate to avoid contact (hit) between the main pattern and the dummy substrate 10.

Figure 11:
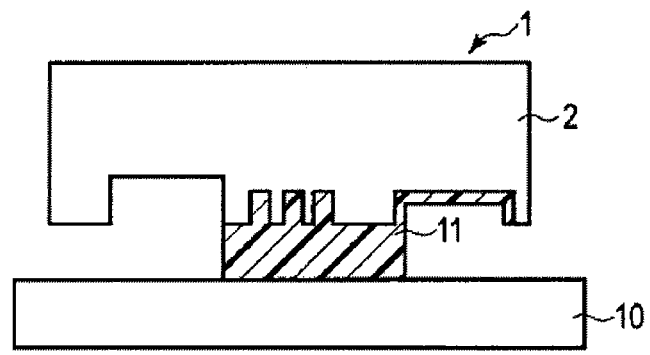
FIG. 11 is a cross-sectional view illustrating the template treatment method in Embodiment 2 succeeding FIG. 10.

Referring now to FIG. 11, using an imprint device used to form an imprint pattern on a full substrate, the template 1 and the dummy substrate 10 are brought into close, but not touching proximity, such that the photocuring resin 11, by capillary or other action, fills in the plurality of recesses of the alignment mark 5.

In this case, as shown in FIG. 10, the photocuring resin 11a and the photocuring resin 11b become monolithic photocuring resin 11 layer that covers the inner surface (bottom surface and side surface) of the plurality of recesses of the dummy pattern 7. Thus, the dummy pattern 8 takes in the photocuring resin, to efficiently suppress contamination of the main pattern caused by flowing of the photocuring resin therein.

Figure 12:
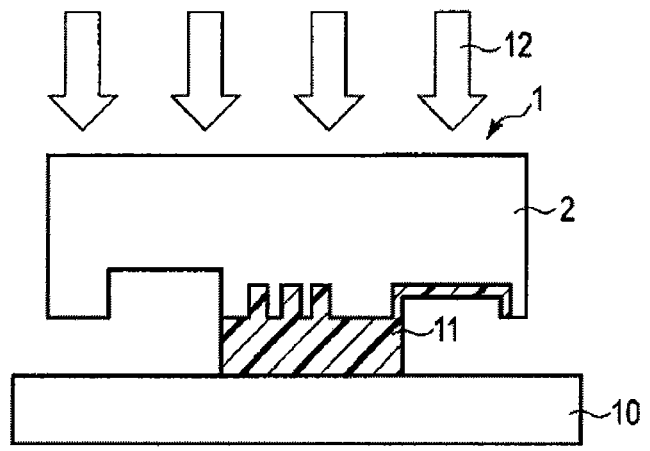
FIG. 12 is a cross-sectional view illustrating the template treatment method in Embodiment 2 succeeding FIG. 11.

Referring now to FIG. 12, the photocuring resin 11 is cured by exposure thereof to light, which passes through the body 2 of the template 1 which the template 2 and dummy substrate remain in close contact with one another and the photocuring resin 11 extends therebetween.

Figure 13:
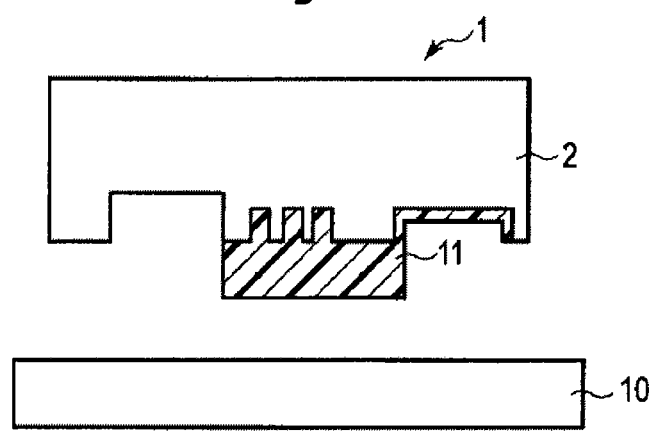
FIG. 13 is a cross-sectional view illustrating the template treatment method in Embodiment 2 succeeding FIG. 12.

Referring now to FIG. 13, the template 1, having the photocuring resin cured thereon, is removed from the underlying dummy substrate. As a result, for the template 1, the alignment mark and dummy pattern are coated by the photocuring resin 11.

Figure 14:
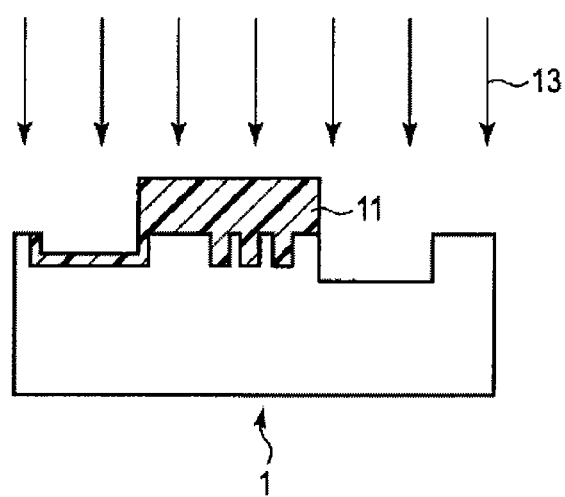
FIG. 14 is a cross-sectional view illustrating the template treatment method in Embodiment 2 succeeding FIG. 13.

Referring now to FIG. 14, forming gas 13 (e.g., oxidizing gas) is used to clean the template 1. In this case, just as in Embodiment 1, the alignment mark 5 is coated by the photocuring resin 11, so that it is possible to suppress degradation in the alignment mark 5 and thus a decrease in the alignment precision Then, just as in the operation shown in FIG. 7 in Embodiment 1, the forming gas 13 is used to perform a treatment (resin removal treatment), so that the coating is removed, and the alignment mark 5 is exposed. Then, just as in Embodiment 1, removal of the residual substance, rinse treatment, and drying are carried out.

According to the preset embodiment, in addition to the effects in Embodiment 1, it is also possible to realize the following effect: it is possible to well suppress contamination of the main pattern by the photocuring resin when the alignment mark is coated by the photocuring resin (coating).

Embodiment 3

In Embodiments 1 and 2, a photocuring resin (imprint resist) is used as the material of the coating (third material). However, in the present embodiment, a material with cleaning worthiness (resistance to the cleaning environment) higher than the photocuring resin is adopted. For example, the mold releasing agent adopted in the conventional imprint process may be used as this type of material.

When the coating is made of a mold releasing agent, for example, the mold releasing agent is fed onto the alignment mark of the template, and thereafter the mold releasing agent is heated.

Figure 15:
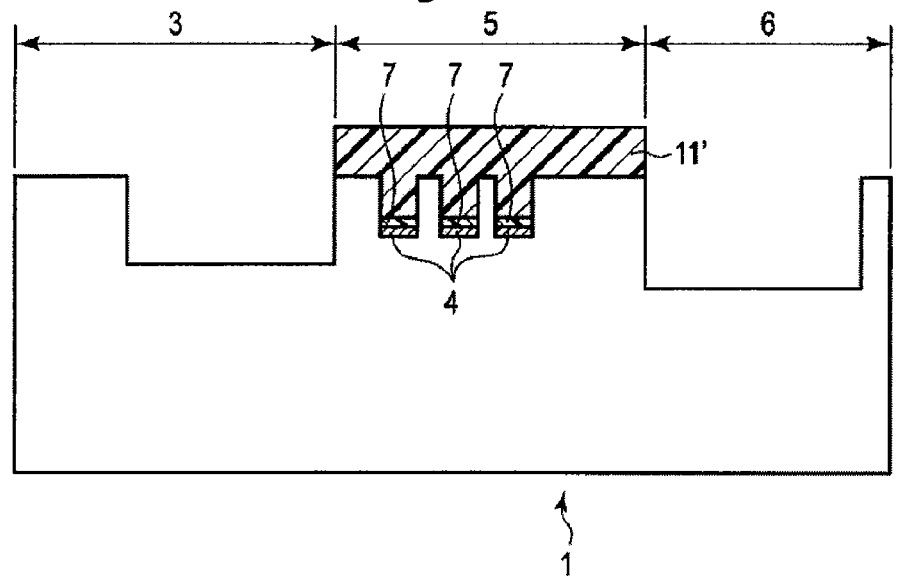
FIG. 15 is a cross-sectional view illustrating the template treatment method in Embodiment 3.

When the mold releasing agent is used, after the forming gas 13 is used to clean the template 1, as shown in FIG. 15, a coating 11' made of a mold releasing agent is left behind, and the contaminant 7 is left beneath the coating 11'. In Embodiments 1 and 2, as shown in FIG. 6, the coating and contaminant are not left, because an oxygen clean treatment may continue and thereby remove the photocuring resin masking the alignment mark 5, and the underlying contaminant 7. However, where a material such as a mold release material 11' is used to mask the alignment mark, the material may be highly resistant to oxidation and removal by an oxygen cleaning, step, and thus a different paradigm is required for the removal thereof.

When the coating 11' and contaminant 7 are to be removed, for example, wet treatment is carried out using a chemical solution containing sulfuric acid. Deionization and drying treatment is then carried out by a hot plate.

Figure 16:
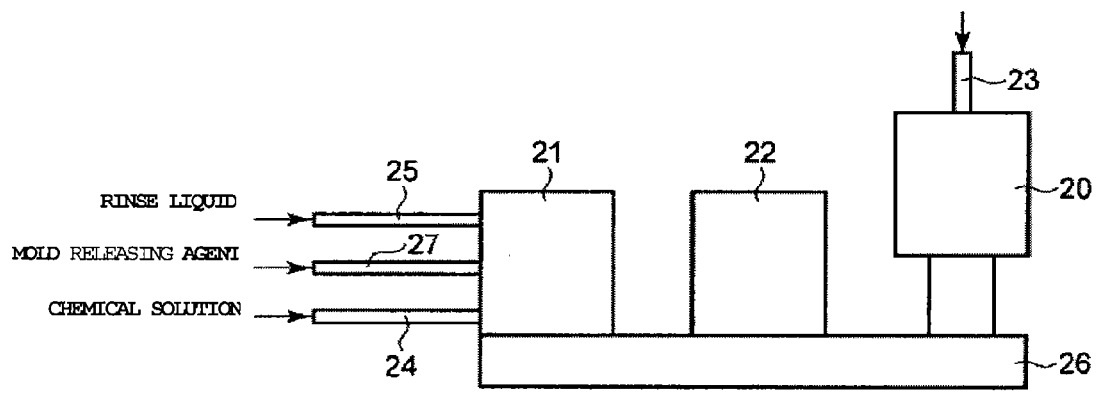
FIG. 16 is a schematic diagram illustrating the template cleaning device in the embodiment.

Formation of the coating 11' and removal of the coating 11' and the contaminant 7 may be carried out using the template cleaning device shown in FIG. 16.

In addition to the supply lines 24, 25 for supplying chemical solution and rinse liquid into a treatment chamber 21', the template cleaning device shown in FIG. 16 also has a supply line 27 for supplying the mold releasing agent. In the treatment chamber 21', a well-known ejecting mechanism that can eject a mold releasing agent onto the desired region of the template is arranged. The mold releasing agent is fed from the supply line 27 to the ejecting mechanism.

The template is transported into the treatment chamber 21', the mold releasing agent is ejected onto the alignment mark of the template by the ejecting mechanism, and the template is transported by the transporting system 26 to the hot plate 22; by heating of the template 1, the coating 11' can be formed.

Then, after the template is cleaned in the cleaning chamber 20, the template 1 is transported back to the treatment chamber 21' by the transport mechanism 26, and the chemical solution is supplied into the treatment chamber 21', and the template is transported by the transporting system 26 onto the hot plate 22, so that the template is heated for deionization treatment, so that the coating 11' can be removed.

This embodiment may be adopted in either Embodiment 1 or Embodiment 2. In addition to the mold releasing agent, it is also possible to use a spin-on-glass (SOG) to coat and mask the alignment mark 5 during template cleaning.

In Embodiment 1 through Embodiment 3, the optical imprint method is adopted in treating the template as explained above. However, the embodiment also can be carried out for the template using the thermal imprint method or other type of imprint method.

The typical constitution of the template treatment method explained above can be listed below.

(1) According to the template treatment method, treatment is carried out for a template having a substrate with a principal surface, a first pattern formed on the principal surface and including a plurality of recesses, and a second pattern formed on the principal surface at a position different from the first pattern and including a plurality of recesses, with the first pattern containing a first material and with the second pattern containing a second material different from the first material.

According to the template treatment method, there are the following operations: a operation in which the second pattern is coated by a coating containing a third material different from the first and second materials, a operation in which the template is cleaned while the second pattern is coated by the coating, and a operation in which the coating is removed after the operation of cleaning of the template so that the second pattern is exposed.

(2) In (1), the first pattern is a pattern corresponding to the device pattern to be mapped to the substrate for processing, and the second pattern is an alignment mark.

(3) In (1) or (2), the operation of cleaning of the template is carried out by using oxygen gas or a chemical solution containing an acid.

(4) In (3), the acid is sulfuric acid.

(5) In any of (1) through (4), the operation in which the second pattern is coated by the coating is carried out using an imprint device.

(6) In (5), the operation in which the second pattern is coated by the coating includes an operation in which the third material is fed onto the substrate using the imprint device, and an operation in which the imprint device is used to cause the second pattern to be in contact with the third material.

(7) In (6), in the operation in which the second pattern is caused to be in contact with the third material, the first pattern does not contact the substrate.

(8) In (7), by controlling the quantity of the third material fed onto the substrate and/or by controlling the distance between the template and the substrate, the first pattern does not contact the substrate.

(9) In (8), the operation in which the template is formed adjacent to the second pattern, there is also a third pattern containing the plurality of recesses; the operation of coating the second pattern includes the following operations: an operation in which the imprint device is used to feed the third material onto the substrate, and a operation in which the imprint device is used to cause the second pattern and the third pattern to be in contact with the third material while the first pattern does not contact the substrate.

(10) In (8), the third pattern is a dummy pattern.

(11) In any of (5) through (10), the third material is an imprint resist material.

(12) In any of (1) through (4), the operation in which the second pattern is coated by the coating is carried out using a template cleaning device.

(13) In (12), the operation in which the second pattern is coated by the coating includes an operation in which the template cleaning device is used to feed the third material onto the second pattern, and an operation in which the template cleaning device is used to heat the third material on the second pattern.

(14) In (13), the third material is a material with a cleaning worthiness higher than that of the imprint resist.

(15) In (14), the material with a cleaning worthiness higher than that of the imprint resist is a mold releasing agent.

(16) In any of (1) through (15), the first material is fused silica.

(17) In (16), the second material is chromium.

(18) In (17), the second pattern includes a plurality of recesses and a plurality of projections formed on the principal surface and uses chromium as the second material covering the bottom surface of the plurality of recesses or the upper surface of the plurality of projections.

While certain embodiments have been described, these embodiments have been presented by way of example only, and are not intended to limit the scope of the invention. Indeed, the novel embodiment described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A template treatment method for treatment of a template substrate that has a principal surface, a first pattern formed on the principal surface and provided with at least one recess, and a second pattern formed on the principal surface at a position different from the first pattern and provided with at least one recess, with the first pattern containing a first material and with the second pattern including a second material different from the first material;

the method comprising:
coating the second pattern with a coating containing a third material different from the first and second materials, wherein the coating the second pattern with the coating includes feeding the third material onto the substrate using an imprint device, and using the imprint device to cause the second pattern to be in contact with the third material;
cleaning the template while the second pattern is coated with the coating; and
removing the coating to expose the second pattern after the cleaning of the template; wherein:
the first pattern is a pattern corresponding to the device pattern to be transferred to the substrate for processing, and the second pattern is an alignment mark.

2. The template cleaning method of claim 1, wherein the cleaning the template includes exposing the template to a material which degrades the properties of the second material.

3. The template cleaning method of claim 2, wherein the cleaning the template comprises exposing the template to a chemical solution comprising a gas, or an acid.

4. The template cleaning method of claim 2, wherein the cleaning the template comprises exposing the template to a mixture of hydrogen gas and nitrogen gas.

5. The template cleaning method of claim 2, wherein the cleaning the template comprises exposing the template to oxygen.

6. The template cleaning method of claim 1, wherein the at least one recess functions as an alignment mark, and the base of the recess includes an optically contrasting material as compared to the material of the template.

7. The template cleaning method of claim 1, wherein, after cleaning of the template, the material coated on the template is removed in a gaseous environment.

8. The template cleaning method of claim 1, wherein the first pattern is formed on a first region of the principal surface and the second pattern is formed on a second region of the principal surface, the second region being at a position that is different from the first region.

9. A template treatment method for treatment for a template having a substrate that has a principal surface, a first pattern formed on the principal surface and including a plurality of recesses, and a second pattern formed on the principal surface at a position different from the first pattern and including a plurality of recesses, with the first pattern containing a first material and with the second pattern containing a second material different from the first material;

the method comprising:

coating the second pattern with a coating containing a third material that is different from the first and second materials;

cleaning the template while the second pattern is coated with the coating; and removing the coating to expose the second pattern after cleaning of the template, wherein the coating the second pattern with the coating is provided by an imprint device.

10. The template treatment method according to claim 9, wherein:

the first pattern is a pattern corresponding to a device pattern to be mapped to the substrate for processing, and the second pattern is an alignment mark and the second material optically contrasts with the first material.

11. The template treatment method according to claim 9, wherein cleaning of the template comprises exposing the template to an oxygen gas or a chemical solution containing an acid.

12. The template treatment method according to claim 9, wherein coating the second pattern with the coating includes:

feeding the third material onto the substrate using the imprint device; and causing the second pattern to be in contact with the third material using the imprint device.

13. The template treatment method according to claim 12, wherein, in the causing the second pattern to contact the third material, the first pattern does not contact the substrate.

14. The template treatment method according to claim 13, further comprising:

controlling at least one of the quantity of the third material fed onto the substrate and the distance between the template to thereby prevent the first pattern from contacting the substrate.

15. The template treatment method according to claim 14, wherein:

the template is formed adjacent to the second pattern, and the template includes a third pattern containing the plurality of recesses; and coating the second pattern with the coating includes:

feeding the third material onto the substrate using the imprint device; and causing the second pattern and the third pattern to be in contact with the third material while the first pattern does not contact the substrate and the third material using the imprint device.

16. The template treatment method according to claim 9, wherein the third material is an imprint resist.

17. The template treatment method according to claim 16, wherein coating the second pattern with the coating is carried out using a template cleaning device.

18. The template treatment method according to claim 17, wherein the third material is a material having a cleaning efficiency that is greater a cleaning efficiency of the imprint resist.

* * * * *